US006303824B1

(12) United States Patent
Ting et al.

(10) Patent No.: US 6,303,824 B1
(45) Date of Patent: Oct. 16, 2001

(54) METHOD OF HYDROGENATING ISO-α ACIDS IN A BUFFERED SOLUTION

(75) Inventors: Patrick L. Ting, Brookfield; Steven M. Hoppe, Watertown; Alfonso Navarro, Milwaukee; Henry Goldstein, Brookfield; David S. Ryder, Mequon, all of WI (US)

(73) Assignee: Miller Brewing Company, Milwaukee, WI (US)

( * ) Notice: Subject to any disclaimer, the term of this patent is extended or adjusted under 35 U.S.C. 154(b) by 0 days.

(21) Appl. No.: 09/438,721

(22) Filed: Nov. 11, 1999

(51) Int. Cl.⁷ .................................................. C07C 45/00
(52) U.S. Cl. .............................................................. 568/350
(58) Field of Search ....................................... 568/347, 350

(56) References Cited

U.S. PATENT DOCUMENTS

| 3,418,135 | 12/1968 | Bayne . | |
|---|---|---|---|
| 4,154,865 | 5/1979 | Grant | 426/600 |
| 4,324,810 | 4/1982 | Goldstein et al. | 426/600 |
| 5,013,571 | 5/1991 | Hay | 426/600 |
| 5,296,637 | 3/1994 | Stegink et al. | 568/341 |
| 5,523,489 | 6/1996 | Ting et al. | 568/347 |
| 5,600,012 | 2/1997 | Poyner et al. | 568/347 |
| 5,767,319 | 6/1998 | Ting et al. | 568/347 |
| 5,874,633 | 2/1999 | Ting et al. | 568/347 |

FOREIGN PATENT DOCUMENTS

| 0 442 621 A1 | 1/1991 | (EP) | C12C/9/02 |
|---|---|---|---|
| WO 97/44304 | 11/1997 | (WO) | C07C/45/62 |

OTHER PUBLICATIONS

M. Anteunis and M. Verzele, "On the Hydrogenation of Humulone, Part II. The mechanism of the Hydrogenolysis," *Bull. Soc. Chim. Belg.* 68:476–483, 1959.

P.M. Brown, et al., "Chemistry of Hop Constituents. Part XIII. The Hydrogenation of isoHumulone," *J. Chem. Soc.*, pp. 545–551, 1959.

"FDA Regulations for Modified Hop Extract and for Solvents Used in the Extraction of Hops," Adjunct Reference Manual, pp. 64–66, 1980.

*Primary Examiner*—Gary Geist
*Assistant Examiner*—Robert W. Deemie
(74) *Attorney, Agent, or Firm*—Quarles & Brady LLP

(57) ABSTRACT

A method of preparing tetrahydroiso-α-acids from iso-α-acids is disclosed wherein the reaction medium is a buffered, aqueous alcoholic solution. The method can also employ up to 85% w/w spent hydrogenation catalyst. The method advantageously avoids the formation of undesirable side products.

12 Claims, No Drawings

METHOD OF HYDROGENATING ISO-α ACIDS IN A BUFFERED SOLUTION

CROSS-REFERENCE TO RELATED APPLICATIONS

Not applicable.

STATEMENT REGARDING FEDERALLY SPONSORED RESEARCH AND DEVELOPMENT

Not applicable.

BACKGROUND OF THE INVENTION

1. Field of the Invention

The present invention relates to the preparation of hop acid derivatives for flavoring beer and other beverages, as well as for use in non-brewing applications. More particularly, it relates to a method of preparing tetrahydroiso-α-acids.

2. Background of the Art

Tetrahydroiso-α-acids are a light stable bittering agent which can be prepared from either α-acids or β-acids. α-acids and β-acids are two major components which are present in extracts of whole hops. Tetrahydroiso-α-acids can be prepared from α-acids by isomerizing the α-acids to iso-α-acids followed by the hydrogenation of iso-α-acids to tetrahydroiso-α-acids. Tetrahydroiso-α-acids can also be prepared by the hydrogenolysis/hydrogenation of β-acids to 4-deoxytetrahydro-α-acids followed by the oxidation/isomerization of 4-deoxytetrahydro-α-acids to tetrahydroiso-α-acids.

U.S. Pat. Nos. 3,552,975; 3,923,897; and 4,644,084 disclose the preparation of tetrahydroiso-α-acids from β-acids. The disclosures of these patents, and all other patents and publications cited hereinafter, are hereby incorporated by reference as if fully set forth herein. However, such processes using β-acids as a starting material require costly and time consuming multi-step manipulations or the use of objectionable organic solvents and chemicals.

U.S. Pat. Nos. 5,013,571; 5,296,637; 5,523,489; 5,600,012; 5,767,319; and 5,874,633 disclose the preparation of tetrahydroiso-α-acids utilizing α-acids or iso-α-acids as the starting material.

U.S. Pat. No. 5,013,571 discloses the simultaneous isomerization/hydrogenation of α-acids to tetrahydroiso-α-acids in a protic solvent system at a pH of 8–12. This patent also discloses the hydrogenation of iso-α-acids to tetrahydroiso-α-acids in a protic reaction system at a pH of 5–12.

U.S. Pat. No. 5,296,637 discloses the hydrogenation of α-acids to tetrahydro-α-acids followed by the isomerization of tetrahydro-α-acids to tetrahydroiso-α-acids.

U.S. Pat. No. 5,523,489 discloses the preparation of tetrahydroiso-α-acids from iso-α-acids by the hydrogenation in a reaction solvent of ethanol containing up to 15% water (w/w) at a pH of 1–7.

U.S. Pat. No. 5,600,012 discloses a process for the preparation of tetrahydroiso-α-acids by hydrogenating iso-α-acids in a non-buffered alcohol solution.

U.S. Pat. No. 5,767,319 discloses the hydrogenation of iso-α-acid metal salts to tetrahydroiso-α-acids in an aqueous lower alkanol solvent having a pH greater than 5.

U.S. Pat. No. 5,874,633 discloses a process of making concentrated single phase solutions of tetrahydroiso-α-acids by hydrogenating a concentrated aqueous alkaline solution of iso-α-acids in an alkanol solvent at a pH of at least above 6.

Anteunis, et al., *Bull. Soc. Chim. Belq.* 68, pp. 476–483 (1959) disclose the catalytic hydrogenation of α-acids in methanol or ethanol under various pH regimes.

Brown, et al., *J. Chem. Soc.* 59, pp. 545–551 (1959) disclose the catalytic hydrogenation iso-α-acids in methanol.

Section 172.250 (b) (6) of Title 21 of the Code of Federal Regulations discloses the hydrogenation of hop extracts using a palladium catalyst in methanol, ethanol, or isopropanol acidified with hydrochloric or sulfuric acid.

With regard to the hydrogenation of iso-α-acids in low pH reaction solutions (as in, for example U.S. Pat. Nos. 5,013,571 and 5,523,489), we have found that if reaction times and temperatures are not closely monitored, the conversion of tetrahydroiso-α-acids into over-reduced products can be considerable.

For practical and economic reasons, the hydrogenation of iso-α-acids should be relatively simple to operate and result in products of high purity and yield. Any deviation in hydrogenation conditions can cause an incomplete reaction which produces edihydroiso-α-acids (partial hydrogenation) along with unreduced iso-α-acids. These products cause light instability in beer. Also, an excessive hydrogenation (perhydrogenation) can occur which gives rise to over-reduced products, called neo-tetrahydroiso-α-acids. Such over-reduced products do not add bitterness to beer.

A complete hydrogenation usually is not achieved without considerable efforts in choosing a selective catalyst, varying the catalyst loading, manipulating the reaction time, changing the reaction temperature and precise monitoring the formation of the products. Quite often, over-reduced products are obtained due to lack of a clear indication to terminate the hydrogenation reaction at the stage where the two double bonds (C=C) have been completely reduced. In particular, when the process is scaled up, inconsistent hydrogenation and over-reduction often occur. Further, the hydrogenation of iso-α-acids to tetrahydroiso-α-acids using only a palladium on carbon type catalyst (due to the BATF regulation) and no organic solvents other than alcohol (when used in food applications) is very delicate and difficult to precisely control. Development of a rugged process is vital in order to achieve a successful scale-up.

Also, such catalytic hydrogenation processes typically require the recovery and refabrication of spent hydrogenation catalyst. Such recovery and refabrication involves the recapture of the noble metal in the spent catalyst followed by the reimpregnation of the noble metal on a suitable support (like carbon). The cost of spent catalyst recovery and refabrication includes not only the direct costs for the same but also the inevitable loss of a certain amount of noble metal (like palladium) during the recovery and refabrication of the catalyst.

The prior art discussed above suffers from one or more of the aforementioned problems. It obviously would be desirable to have a simple method of making tetrahydroiso-α-acids from iso-α-acids which does not result in the formation of undesired products and in which it is easy to isolate the tetrahydroiso-α-acids from the reaction mixture. It would also be desirable to recycle at least a portion of the spent hydrogenation catalyst to reduce the cost of recovering and refabricating such catalyst.

SUMMARY OF THE INVENTION

We have discovered a method of preparing tetrahydroiso-α-acids that does not result in the formation of undesirable products and that also utilizes spent hydrogenation catalyst.

One aspect of the present invention provides a method of preparing tetrahydroiso-α-acids comprising the steps of preparing a buffered, aqueous alcoholic solution of iso-α-acids; and hydrogenating the iso-α-acids in the presence of hydrogen and a noble metal catalyst to obtain tetrahydroiso-α-acids. Preferably, the hydrogenation step is conducted at a temperature from 0° C. to 100° C., more preferably from 50° C. to 60° C. It is preferred that the noble metal catalyst comprises palladium. Preferably, the buffered solution of iso-α-acids has a pH of from 2.0 to less than 5.0 and, more preferably, a pH from 3.0 to 4.0. Preferably, the solution of iso-α-acids is buffered with inorganic salts which are selected from the group consisting of magnesium acetate, magnesium carbonate, hydroxide, calcium acetate, calcium carbonate, and calcium hydroxide. Preferably, the solution of iso-α-acids is acidified with inorganic acids which are selected from the group consisting of acidic acid, carbonic acid, sulfuric acid, and hydrochloric acid. It is also advantageous that the noble metal catalyst contain up to 85% w/w spent catalyst. It is preferred that the alcohol is a lower alkanol, most preferably ethanol.

The present invention also provides a method of preparing tetrahydroiso-α-acids comprising the steps of preparing an aqueous alcoholic solution of iso-α-acids; and hydrogenating the iso-α-acids in the presence of a noble metal catalyst containing up to 85% w/w spent catalyst. Advantageously, the aqueous alcoholic solution of iso-α-acids is buffered, preferably at a pH of from 2.0 to less than 5.0. More preferably, the pH is from 3.0 to 4.0. It is preferred that the noble metal catalyst comprises palladium. Preferably, the solution of iso-α-acids is buffered with inorganic salts which are selected from the group consisting of magnesium acetate, magnesium carbonate, magnesium hydroxide, calcium acetate, calcium carbonate, and calcium hydroxide. Preferably, the solution of iso-α-acids is acidified with inorganic acids which are selected from the group consisting of acidic acid, carbonic acid, sulfuric acid, and hydrochloric acid. It is preferred that the alcohol is a lower alkanol, most preferably ethanol. It is preferred that the hydrogenation step is conducted at a temperature from 0° C. to 100° C., more preferably from 50° C. to 60° C.

DETAILED DESCRIPTION OF THE INVENTION

We have unexpectedly found that the hydrogenation of iso-α-acids in a buffered aqueous alcoholic solution improved the purity and yield of tetrahydroiso-α-acids and the ruggedness of the hydrogenation reaction as compared to using an unbuffered medium. The pH of the buffered solution can be as high as 10 but the preferred pH is from 2.0 to less than 5.0. Still more preferred is a pH from 3.0 to 4.0. The hydrogenation reaction can be run at a temperature from 0° C. to 100° C. but a temperature from 50° C. to 60° C. is more preferred. The hydrogenation reaction can be run at a pressure from 1 psig to 200 psig but a pressure from 10 psig to 50 psig is more preferred.

The buffered solution is preferably made of iso-α-acids, inorganic salts and an inorganic acid in an aqueous alcohol. Preferably, the alcohol is a lower alkanol. By lower alkanol we mean those branched or straight chain alcohols having 1–6 carbons. Most preferred is ethanol. The preferred inorganic salts include magnesium acetate, magnesium carbonate, magnesium hydroxide, calcium acetate, calcium carbonate, and calcium hydroxide while the preferred inorganic acids are acetic acid, carbonic acid, sulfuric acid, and hydrochloric acid. The hydrogenation reaction was typically completed in 1.5–2 hours at 50–60° C. However, an additional 1–2 hour reaction time had minimal effect on the quality of the products. (See Example 7)

The aqueous alcohol should have at least 5% v/v water/alcohol. The upper limit for the amount of water is dependent on the solubility of the iso-α-acids. One would want to reduce the amount of water if solubility problems are encountered with the iso-α-acids. Preferably, the aqueous alcohol has 10–20% v/v water.

Iso-α-acids can be prepared by well-known processes involving the isomerization of α-acids. Examples of such processes are disclosed in U.S. Pat. Nos. 3,765,903; 3,952,061; 4,154,865; 4,160,787; 4,234,516; 4,247,483; and 5,015,491.

β-acids can also be used for the production of tetrahydroiso-α-acids. U.S. Pat. No. 4,644,084 discloses such a process. A palladium on carbon catalyst is utilized for the step of hydrogenation/hydrogenolysis reaction. Typically, this catalyst has been considered spent after one hydrogenation reaction due to its inability to be reused for a second time. This is considered undesirable due to the great financial expense.

However, we have unexpectedly discovered that this spent catalyst is suitable for the hydrogenation of iso-α-acids. Employing a blend of up to 85% w/w of the spent catalyst and the remainder new catalyst effectively hydrogenated iso-α-acids to tetrahydroiso-α-acids in an excellent yield and higher quality. Note that spent catalyst from the hydrogenation of iso-α-acids to tetrahydroiso-α-acids can be employed in this same manner. The spent catalyst significantly moderates the hydrogenation reaction and thus eliminates the over-reduction of tetrahydroiso-α-acids. It effectively maintained this reaction stability even after a period of an extra one to two hours at 50–60° C. The reaction affords 85–90% yield. (See Example 5)

Note that depending on the intended use of the tetrahydroiso-α-acids (i.e., whether it will be used in beverages or food) other noble metals can be used to catalyze the hydrogenation reaction. Examples of such noble metals would include Pt, Ni, Ir, Rh, Ru, and Os. Further, again depending on the intended use, any other non-noble metal hydrogenation catalyst could be used. Such hydrogenation catalysts are well known in the art. Suppliers of hydrogenation catalysts include Johnson Matthey, Degussa, and Engelhard.

We believe that a combination of using the aforementioned buffered system (we believe that the inorganic salt cations provide protection from over-reduction of iso-α-acids in the lower pH range) and spent catalyst provides a unique process. The use of spent catalyst enables the utilization of one catalyst for two processes.

EXPERIMENTAL SECTION

Example 1

A solution of 50 g of iso-α-acids, 210 ml of ethanol 95%, and 40 ml of water was added to a one liter autoclave. To this solution 5 g of 5% w/w Pd/C catalyst (on dry basis) was added. The autoclave was charged with 50 psig of nitrogen three times followed by 20 psig of hydrogen. This reaction, being exothermic, was allowed to proceed from ambient temperature without external heating. The uptake of hydrogen ceased after 1.5 hours. After removal of the catalyst, the ethanol was evaporated yielding an oily material. The oily material was washed with water and then phase separated, which produced 70–75% yield of tetrahydroiso-α-acids and 5–10% over-reduced products (analyzed by HPLC).

Example 2

A solution of 50 g of iso-α-acids, 210 ml of ethanol 95%, 40 ml of water, 15 g of magnesium acetate was adjusted to a pH of about 3.4 using 50% sulfuric acid. To this solution 3.5 g of 5% w/w Pd/C catalyst was added. The autoclave was then charged with 50 psig nitrogen three times followed by 20 psig hydrogen. This reaction was heated to 50–60° C. for 1–2 hour. The uptake of hydrogen ceased after 1 hour. After removal of the catalyst, the ethanol was evaporated yielding an oily material. The oily material was washed with water and then phase separated to produce 84% yield of tetrahydroiso-α-acids with minimum amount of over-reduced products. The final product was formulated to 10% (w/w) in KOH aqueous solution to be used as a post kettle bittering agent.

Example 3

A solution of 50 g of iso-α-acids, 210 ml of ethanol 95%, 40 ml of water, 4.4 g of magnesium hydroxide was adjusted to a pH of about 3.5 using 50% sulfuric acid. To this solution 3.5 g of 5% w/w Pd/C catalyst was added. The autoclave was then charged with 50 psig nitrogen three times followed by 20 psig hydrogen. This reaction was heated to 50–60° C. for 2 hours. The uptake of hydrogen ceased after 2 hours. After removal of the catalyst, the ethanol was evaporated yielding an oily material. The oily material was water washed and phase separated which produced 87% yield of tetrahydroiso-α-acids with minimum amount of the over-reduced products. The final product was formulated to 10% (w/w) in KOH aqueous solution for use as a post-kettle bittering agent.

Example 4

A solution of 50 g of iso-α-acids, 210 ml of ethanol 95%, 40 ml of water, 3.8 g of calcium carbonate was adjusted to a pH of about 3.5 using 50% sulfuric acid. To this solution 3.5 g of 5% w/w Pd/C catalyst was added. The autoclave was then charged with 50 psig nitrogen three times followed by 20 psig hydrogen. This reaction was heated to 50–60° C. for 2 hours. After removal of the catalyst, the ethanol was evaporated yielding an oily material. The oily material was water washed and phase separated which produced 81% yield of tetrahydroiso-α-acids and a minimum amount of the over-reduced products.

Example 5

A solution of 50 g of iso-α-acids, 210 ml of ethanol 95%, 40 ml of water, 3.8 g of magnesium hydroxide was adjusted to a pH of about 3.6 using 50% sulfuric acid. To this solution 1 g of new 5% w/w Pd/C and 4.8 g of spent 5% w/w Pd/C (17% new/83% spent) was added. The autoclave was then charged with 50 psig nitrogen three times followed by 20 psig hydrogen. This reaction was heated to 50–60° C. for 2 hours. After removal of the catalyst, the ethanol was evaporated yielding an oily material. The oily material was water washed and phase separated, which produced 88% yield of tetrahydroiso-α-acids with no over-reduced products.

Example 6

To 65 g of iso-α-acids (80% purity) was added 40 ml of water, 210 ml of 95% ethanol, 4.4 g of magnesium hydroxide and adjusted to pH of about 3.4 using 50% sulfuric acid. The solution was then added 5 g of 5% w/w Pd/C catalyst in a one-liter autoclave. The autoclave was charged with 50 psig of $N_2$ and then 20 psig of $H_2$ three times. The reaction mixture was maintained at 30–55° C. and 20 psig until the uptake of hydrogen ceased. The reaction took 2–3 hours. After filtration of the catalyst, the filtrate was evaporated to remove the ethanol. After water wash and phase separation, it produced an oily material with an 86% yield of tetrahydroiso-α-acids. It was then formulated to 5–10% concentration in an aqueous potassium solution to be used as the post-kettle bittering agent.

Example 7

To 22.2 kg of iso-α-acids (80% purity) was added 14.1 kg of water, 75.7 L of 95% ethanol, 1.7 kg of magnesium hydroxide and adjusted to pH of about 3.5 using 0.6 L concentrated sulfuric acid. To this solution was added 3.6 kg of 5% w/w Pd/C catalyst in a 190 L reactor. The reactor was charged with 50 psig of nitrogen and then 20 psig of hydrogen three times. The reaction mixture was maintained at 50–60° C. and 20 psig until the uptake of hydrogen ceased. The reaction took 2 hours but was extended two additional hours for the purpose of demonstrating the rugged nature of the reaction. After filtration of the catalyst, a 130.6 kg of filtrate was obtained and found to contain 14.2% (w/w) tetrahydroiso-α-acids with a minimum amount of over-reduced products. This afforded an 83% yield.

We claim:

1. A method of preparing tetrahydroiso-α-acids comprising the steps of:
    preparing a buffered, aqueous alcoholic solution of iso-α-acids, wherein the buffered solution of iso-α-acids has a pH of from 2.0 to less than 5.0; and
    hydrogenating the iso-α-acids in the presence of hydrogen and a noble metal catalyst to obtain tetrahydroiso-α-acids.

2. The method of claim 1, wherein the hydrogenation step is conducted at a temperature from 0° C. to 100° C.

3. The method of claim 2, wherein the temperature is from 50° C. to 60° C.

4. The method of claim 1, wherein the noble metal catalyst comprises palladium.

5. The method of claim 1, wherein the buffered solution of iso-α-acids has a pH from 3.0 to 4.0.

6. The method of claim 1, wherein the solution of iso-α-acids is buffered with inorganic salts.

7. The method of claim 6, wherein the inorganic salts are selected from the group consisting of magnesium acetate, magnesium carbonate, magnesium hydroxide, calcium acetate, calcium carbonate, and calcium hydroxide.

8. The method of claim 1, wherein the solution of iso-α-acids is acidified with inorganic acids.

9. The method of claim 8, wherein the inorganic acids are selected from the group consisting of carbonic acid, sulfuric acid, and hydrochloric acid.

10. The method of claim 1, wherein the noble metal catalyst contains up to 85% w/w spent catalyst.

11. The method of claim 1, wherein the alcohol is a lower alkanol.

12. The method of claim 11, wherein the lower alkanol is ethanol.

* * * * *